US009542429B2

(12) United States Patent
Abbour et al.

(10) Patent No.: US 9,542,429 B2
(45) Date of Patent: Jan. 10, 2017

(54) WORKLOAD BALANCING IN A DISTRIBUTED DATABASE

(71) Applicant: International Business Machines Corporation, Armonk, NY (US)

(72) Inventors: Mohamed A. Abbour, Dublin (IE); Roy R. Cecil, Dublin (IE); Ciaran De Buitlear, Stamullen (IE); John Matthews, Mulhuddart (IE); Patrick A. Meehan, Meath (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 159 days.

(21) Appl. No.: 14/171,111

(22) Filed: Feb. 3, 2014

(65) Prior Publication Data
US 2014/0297611 A1 Oct. 2, 2014

(30) Foreign Application Priority Data

Feb. 5, 2013 (GB) .................................. 1302009.4

(51) Int. Cl.
G06F 7/00 (2006.01)
G06F 17/30 (2006.01)
(52) U.S. Cl.
CPC ... *G06F 17/30362* (2013.01); *G06F 17/30442* (2013.01); *G06F 17/30545* (2013.01); *G06F 17/30575* (2013.01)
(58) Field of Classification Search
CPC .................. G06F 17/30362; G06F 17/30445; G06F 17/30433; G06F 17/30575; G06F 17/30545; G06F 17/30442
(Continued)

(56) References Cited

U.S. PATENT DOCUMENTS 6,411,985 B1 * 6/2002 Fujita ................ G06F 17/30575
707/999.202
8,209,696 B2 6/2012 Ferguson et al.
(Continued)

FOREIGN PATENT DOCUMENTS

CN 1489069 A 4/2004
CN 102622275 A 8/2012
WO 2012070292 A1 5/2012

OTHER PUBLICATIONS

Great Britain Search Report dated Aug. 9, 2013 for Application No. GB1302009.4.
(Continued)

*Primary Examiner* — Md. I Uddin
(74) *Attorney, Agent, or Firm* — Cantor Colburn LLP

(57) ABSTRACT

A distributed database management system balances the load on query boundaries and to achieve a more evenly balanced load. The system includes two or more query processors with a common data source. A database client manages a transaction including two or more queries. A transaction analyzer checks if a transaction can be processed by more than one query processor. A query processor optimizer locates the optimum query processor for each query in the transaction based on workload of each query processor, while a workload balancer directs each query to the optimum query processor if the transaction can be processed by more than one query processor. This approach is particularly well suited to a clustered database environment that includes query processor nodes that work off a shared disk to provide database access to clients that connect to the node.

16 Claims, 15 Drawing Sheets

(58) Field of Classification Search
USPC .................. 707/703, 718, E17.005, 999.008, 706,707/770
See application file for complete search history.

(56) References Cited

U.S. PATENT DOCUMENTS

| | | | |
|---|---|---|---|
| 8,280,869 B1* | 10/2012 | Burger | G06F 17/30501 707/706 |
| 2003/0037093 A1* | 2/2003 | Bhat | G06F 9/505 718/105 |
| 2005/0021511 A1 | 1/2005 | Zarom | |
| 2006/0230016 A1 | 10/2006 | Cunningham et al. | |
| 2007/0174248 A1 | 7/2007 | Kumugai et al. | |
| 2007/0203910 A1 | 8/2007 | Ferguson et al. | |
| 2008/0077932 A1* | 3/2008 | Ruppach | G06F 9/5038 718/105 |
| 2009/0037367 A1 | 2/2009 | Wein | |
| 2009/0235255 A1 | 9/2009 | Hu et al. | |
| 2009/0248631 A1 | 10/2009 | Alba et al. | |
| 2010/0114870 A1 | 5/2010 | Al-Omari et al. | |
| 2012/0131093 A1 | 5/2012 | Hamano et al. | |

OTHER PUBLICATIONS

Hargis, SD; "Workload Monitoring in a Distributed Database Environment"; ip.com; p. 1-4; Mar. 25, 2005.
IBM; "Load Distribution of Analytical Query Workloads for Database Cluster Archtectures"; ip.com; p. 1-13; Oct. 22, 2008.
Oracle Databas; "7 Managing Database Workload Using Services"; retrieved from http://docs.oracle.com/cd/B28359_01/rac.111/b28252/configwlm.htm on Jan. 11, 2012; p. 1-23.
International Search Report and Written Opinion dated Jun. 11, 2014 for Application No. PCT/IB2014/058570.

* cited by examiner

Extended Database Client 300

Database Client Engine 302

Transaction Distribution Analyzer 304

Transaction Type Analyzer 306

Query Processor Optimizer 308

Query Workload Balancer 310

Extended Database Client Method 400

FIGURE 3

Database Server Module 500

Server Engine 502

List of Weights For Each Node Member 504

FIGURE 5A

WORKLOAD BALANCING IN A DISTRIBUTED DATABASE

PRIORITY

This application claims priority to Great Britain Application No. 1302009.4, filed Feb. 5, 2013, and all the benefits accruing therefrom under 35 U.S.C. §119, the contents of which in its entirety are herein incorporated by reference.

BACKGROUND

Embodiments of the invention relate to distributed database systems and, more particularly, to transaction independent workload balancing in a distributed database with a common data source.

Transactions that use a distributed database system may require data from a common data source across the distributed database system. In this type of distributed database with a common data source, certain processing nodes can get overworked compared to other processing nodes and can therefore be more prone to faults and errors. In particular, an uneven load profile on the processing nodes can adversely impact the overall throughput of the system and potentially cause the system to fail to meet its designed goals. Workload balancing responds to these concerns by distributing workload across the different processing nodes in a balanced way. There is a continuing need for improved workload balancing techniques for distributed database systems.

SUMMARY

The invention may be embodied in a distributed database management system that includes two or more query processors with a common data source. A database client manages a transaction including two or more queries. A transaction analyzer checks if a transaction can be processed by more than one query processor. A query processor optimizer locates the optimum query processor for each query in the transaction based on workload of each query processor, while a workload balancer directs each query to the optimum query processor if the transaction can be processed by more than one query processor.

The subject matter regarded as the invention is particularly pointed out and distinctly claimed in the concluding portion of the specification. The invention, both as to organization and procedure of operation, together with objects, features, and advantages thereof, may best be understood by reference to the following detailed description when read with the accompanying drawings.

BRIEF DESCRIPTION OF THE SEVERAL VIEWS OF THE DRAWINGS

Preferred embodiments of the present invention will now be described, by way of example only, with reference to the following drawings in which:

FIG. 3 is a component diagram of an extended database client according to an embodiment of the invention;

FIGS. 5A and 5B are component diagrams of a database server module and a cluster caching facility (CF) server module respectively of a particular embodiment;

DETAILED DESCRIPTION

Figure 1:
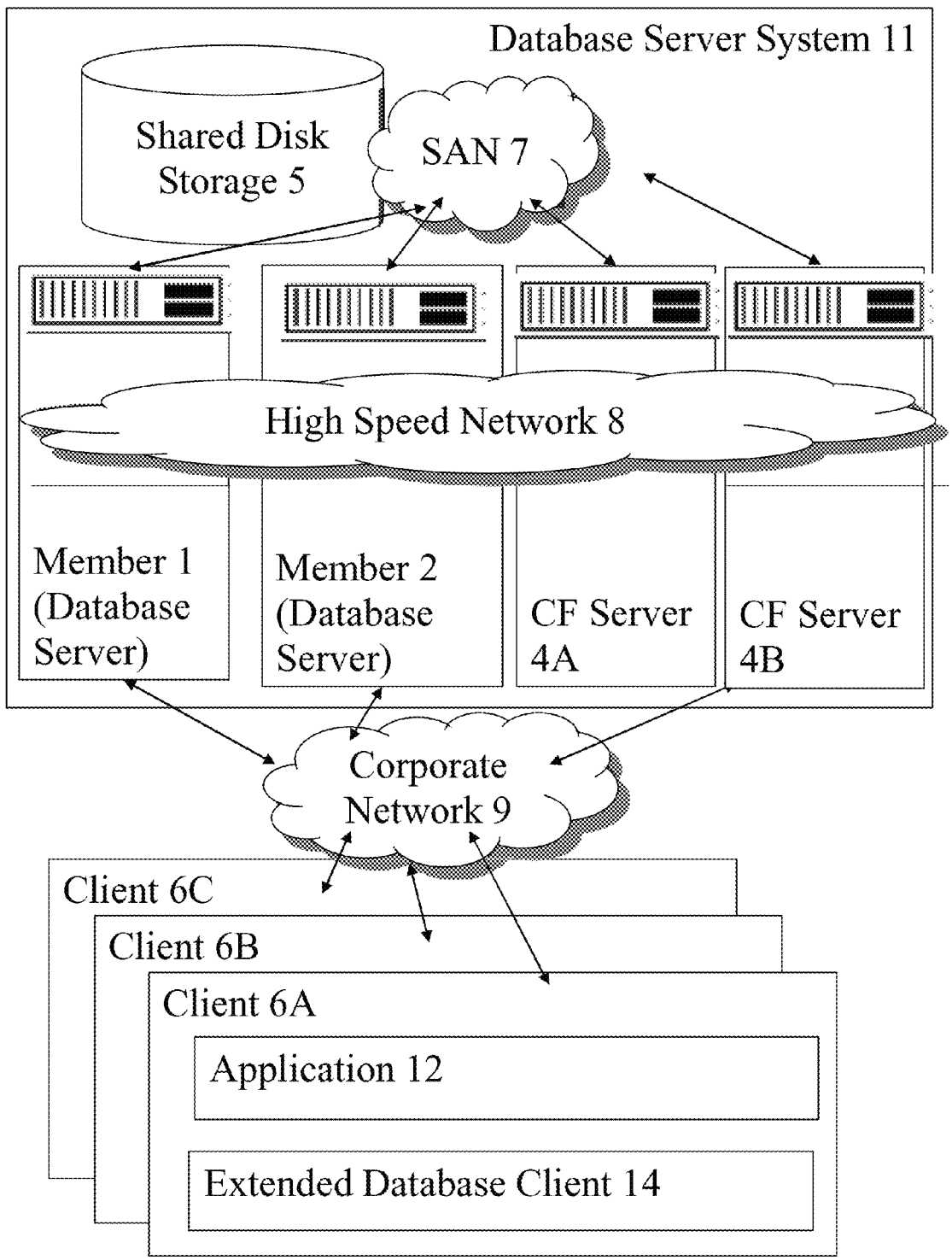
FIG. 1 is a deployment diagram of an embodiment of the invention.

The present invention may be embodied in a distributed database management system for transaction processing. Traditionally workload balancing is of two types. Firstly, connection level workload balancing, where the number of connections from a client to a server is balanced by distributing the connections equally among available servers. A problem with connection level workload balancing is that there is no guarantee that the amount of work performed by a server is balanced as one set of connections might generate more or less work in terms of processor load on the server.

Secondly, transaction level load balancing, where at each transaction boundary the best server is chosen to process the request and the workload balancing is performed across each of the transaction boundaries. A problem with transaction level workload balancing is that, there is a greater complexity that needs to be built into the system to gather the load on each machine and pass that information to the clients. Clients then have to make a decision as to which server to route the next transaction to. A further problem with the transaction level workload balancing is that it can completely fail for a workload that performs long running transactions; as an example consider one thousands of selects, including those for large data objects and followed by a few updates in a single transaction. This type of workload can break transaction level workload balancing because the transaction has to complete all the work on a single node to which the client is connected until either a commit or a rollback occurs. Even though the load profiles on certain nodes are higher than other processing nodes, work cannot be redistributed because redistribution only occurs on transaction boundaries.

The distributed database management transaction processing system embodying the present invention balances the load on query boundaries to achieve a more evenly balanced load. The system includes two or more query processors with a common data source. A database client manages a transaction including two or more queries. A transaction analyzer checks if a transaction can be processed by more than one query processor. A query processor optimizer locates the optimum query processor for each query in the transaction based on workload of each query processor, while a workload balancer directs each query to the optimum query processor if the transaction can be processed by more than one query processor. This approach is particularly well suited to a clustered database environment that includes query processor nodes that work off a shared disk to provide database access to clients that connect to the node.

The distributed database management transaction processing system typically includes an application for interacting with the database client and for identifying a distributable transaction with a tag before it is sent to the database client. The proposed solutions may include tagging a transaction that is capable of distribution as <distributable>; checking if the distributable transaction is fully distributable at query boundaries; and performing a test to check if the distributable transaction can be migrated in practice. If the distributable transaction can be migrated in practice then migration is performed in an atomic fashion and the transaction is passed to a new member.

The distributed database management transaction processing system may also update a list of workload availability of each query processor and updating the query processor optimizer with the list of workload availability. Query processors (also known as members or nodes) maintain a list of weights for each processor in the cluster. The weights are refreshed periodically and are fed back to the clients who connect to it. The client makes use of the information to decide which processor to route the next transaction to. A higher weight represents an underutilized in this model. This feature is called automatic client reroute. The weight information is piggybacked to the end of each transaction query or sent periodically.

The application may be further tasked with identifying and tagging a transaction with a transaction type, for instance, whether the transaction is a short miming or long running transaction. The distributed database management transaction processing system may further include a cursor checker for identifying open cursors. An open cursor is an open reference to query results.

Additional features may include a logging engine for logging records of the mapping between the query processor, application and transaction and logging events pertaining to changes to the underlying data, a roll back mechanism for rolling back a transaction using the log records, and a lock mechanism for locking portions of the common data source at a query level to a specified query processor. In certain embodiments, the lock can be transferred to a new query processor when a transaction is transferred to a new query processor. The system may also utilize an existing global lock and cache data together with persistent log data to manage the transfer of a transaction from one query processor to another. If a prior processor on which the transaction query was running fails, then it can continue on the new node independently of any failure on the prior node because the transaction is transferred as a whole. This represents an improvement over prior art transaction management systems, in which the entire transaction has to be rolled back.

The distributed database management transaction processing system enables time-slicing transaction processing across multiple query processors and committing a transaction does not require a co-ordination with any other query processor because events of query migration are logged into permanent storage prior to the event whereby all history up until that point is reflected in the log records. The system also enables transactions to migrate from one query processor to another and to get scheduled based on the load on the query processors and makes global information available together with the logging data at the point of transfer. As a result, there is no need to store or manage the prior query processor handling the transferred transaction prior to the transfer.

Embodiments of the distributed database management transaction processing system may rely on an existing load balancing mechanism running on any query processor and do not need a specific server load balancer component. This provides a solution for a non-distributed transaction situation allowing the transaction to be split at query and change boundaries prior to commit. Other embodiments can accommodate a transfer at any juncture (query/change) within the transaction, while relating to query/change level workload balancing of selected transactions at a finer granularity than transaction level workload balancing and explicitly focus on a problem in transaction level workload balancing. The system has a balancing effect on server processes carried on outside the client computer as the loading balancing is performed by the client and the effects of a balanced workload are experienced by the servers. The balancing effect may also operate at the machine level of the computer where they are transparent to the application executing on the client. These balancing effects can result in the computer operating a completely new way of load balancing transactions, which can lead to an increase in the speed and reliability of the computer servers since there is less chance of one server being overloaded and ensure better overall throughput.

The distributed database management transaction processing system typically includes two or more query processors along with at least one database client for processing a transaction including two or more queries with a common data source. The transaction system checks that a transaction can be processed by more than one query processor, locates the optimum query processor for each query in the transaction based on workload at each query processor, and directs each query to the new optimum query processor if the transaction can be processed by more than one query processor.

In a particular embodiment, computer instructions for implementing the distributed database management transaction processing system are stored on a computer program product. The computer program product may include a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A computer program stored on a computer readable medium is loadable into the internal memory of a digital computer. The computer program includes software code portions that, when run on a computer, cause the computer to perform the methods described in this disclosure. A data carrier may likewise include computer data structures that, when loaded into a computer system and operated upon thereby, enable the computer system to perform the methods. A suitable data-carrier could be a solid-state memory, magnetic drive or optical disk. Channels for the transmission of data may likewise include storage media of all descriptions as well as signal-carrying media, such as wired or wireless signal-carrying media.

Referring to FIG. 1, an embodiment of the distributed database management system 10 typically includes a database server system 11 connected via corporate network 9 to clients 6A, 6B, and 6C. Clients 6A, 6B and 6C send out transactions and queries from their users. Each client includes an application 12 and an extended database client 14. Application 12 is a user operated computer program for creating transactions where transaction details are under the control of the user and the method of the transaction is under the control of the computer program.

Extended database client 14 is that part of the database system that resides on a client and is for providing data to and from application 12 and database server system 11. Corporate network 9 allows the database clients to connect with database server system 11 and includes an Ethernet or equivalent network. Database server system 11 is for receiving the transaction from a client and returning a result back to the respective client. Database server system 11 includes: a cluster of database servers (member 1 and member 2); cluster caching facility (CF) servers 4A and 4B; shared disk storage 5; storage area network (SAN) 7; and high speed network 8. Members 1 and 2 may be database servers for delivering data to requesting clients. When a client such as 6A requires data, a connection is routed to a member that then processes the request. All members read from and write to the same database on shared disk storage 5 and the full set of data is shared among them. Each member runs its own processes and threads, and each member includes its own buffer pools, memory regions, and log files. Two members (Members 1 and 2) are shown in FIG. 1 but more members can be added to the cluster limited only by the capacity of the database configuration.

Cluster caching facility (CF) servers 4A and 4B are for 1) providing faster data access as data fetched from the CF is fetched orders of magnitude faster than data fetched from the disk subsystems; and 2) providing serialization mechanism for data structures shared across members to ensure the consistency of the data. The preferred configuration is one member per host and a preferred host is a computer but in an alternative embodiment a host can be a logical partition (LPAR) on a computer. To take advantage of the design for a continuously available environment and to help provide optimum performance, a particular embodiment has a minimum of two database members, each on its own computer. Although all database members might initially use identical hardware specifications, hardware homogeneity is not required. Host computers can be added as a system is scaled.

Cluster caching facility (CF) 4A (also 4B) is a particular type of database server. The cluster caching facility is used to coordinate locking through a global lock manager to prevent conflicting access to the same table data by different members. The cluster caching facility is also used to keep page caching consistent across all members through a shared group buffer pool. The group buffer pool coordinates copies of pages that might exist across the (local) buffer pools of members. The cluster caching facility also provides a shared communication area (SCA). Members can use this shared communication area to emulate cluster wide shared memory.

At least one cluster caching facility (for example 4A) must be online for a database to be available while members are online. To take advantage of the design for a continuously available environment a particular embodiment uses multiple cluster caching facilities (for example 4B). Duplexing of both metadata and database data to a secondary cluster caching facility (for example 4B) ensures that while it is active, it remains in peer state with the primary CF (for example 4A). If the primary CF fails, the secondary CF can take over to maintain database availability. Cluster caching facilities can run on their own computers or they can share hosts with members by running on their own logical partitions (LPARs).

Shared disk storage 5 is shared among all servers in the database environment and is for storing common database data. Such common database data includes instance configuration and other database information, such as logs, metadata, log archives, and backups. Shared disk storage 5 is used for storing problem determination information from members and cluster caching facilities, such as log files and first occurrence data capture (FODC) information. Shared disk storage 5 is used for arbitrating which members and cluster caching facilities will remain operational in the event that a severe communication failure prevents one half of the hosts from communicating with the other half. This arbitration process prevents sets of hosts from processing database requests independent of each other. In the event of a severe communication failure where one set of hosts is unable to communicate with another, the larger set will automatically remain operational. If the sets are equal, a tiebreaker shared disk is used to arbitrate which set remains operational.

Storage area network (SAN) 7 is for accessing shared disk storage 5 using a fiber channel based transport mechanism for all extended database servers. SAN support allows for fast detection of failing members and fencing of those members from the shared disk, so that the consistency of the data is preserved and the member recovery time is reduced.

High speed network 8 is for communication between all types of database servers. The performance of high speed network 8 is critical because it is used to communicate locking and caching information across the cluster. All hosts in the instance must use the same type of interconnect. A particular embodiment uses InfiniBand with Remote Direct Memory Access (RDMA) support but 10 Gigabit Ethernet with RDMA support could also be used. InfiniBand is an industry standard communications link that provides quality-of-service and failover support, and is designed for scalability. The use of RDMA enables direct updates in member host memory without requiring member processor time. InfiniBand is a trademark of the InfiniBand Trade Association in the US and/or other countries.

Figure 2A:
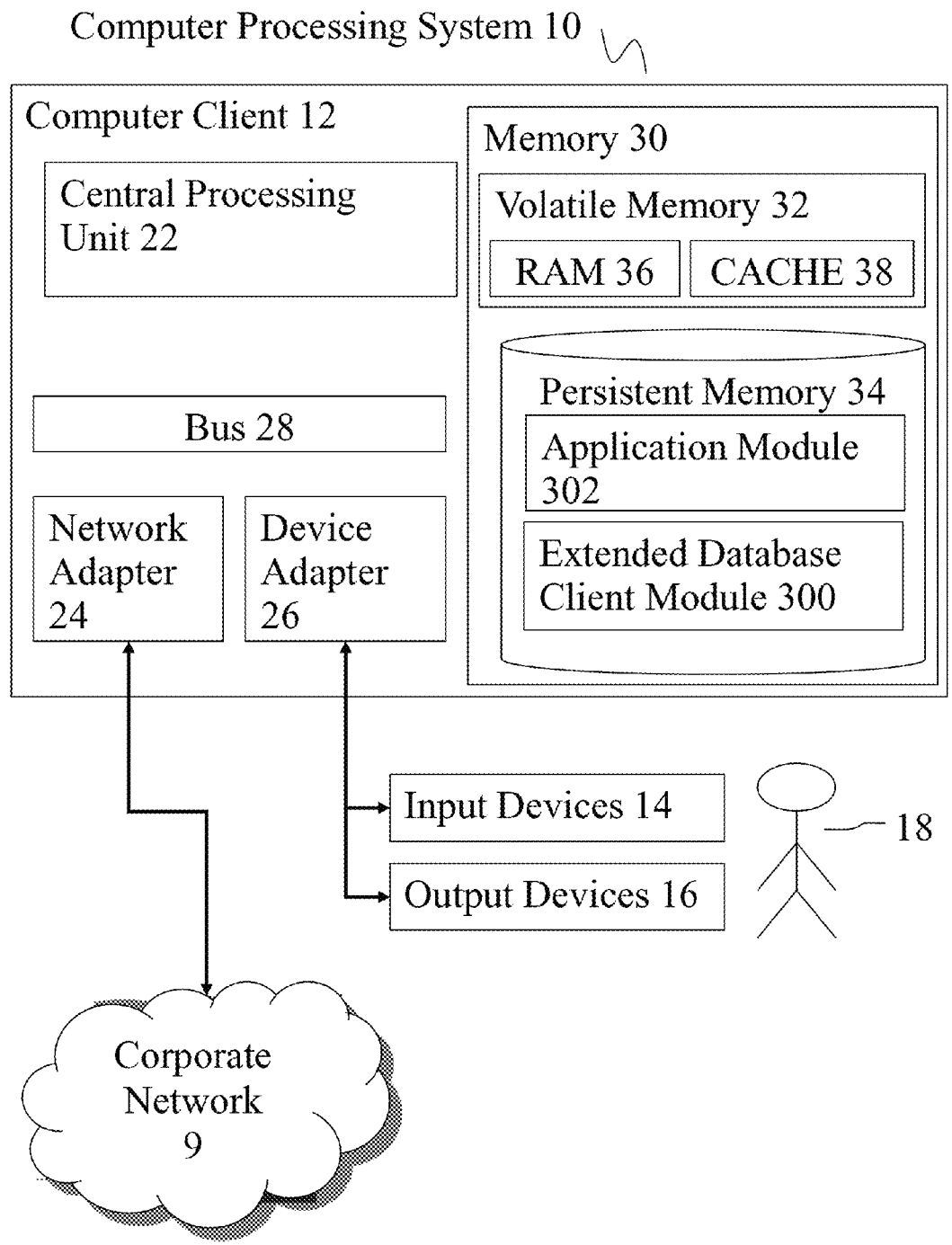
FIG. 2A is a component diagram of a computer client according to an embodiment of the invention.

Referring to FIG. 2A, the deployment of application module 302 and extended database client module 300 are described in computer processing system 10 for computer client 12 according to a preferred embodiment.

Figure 2B:
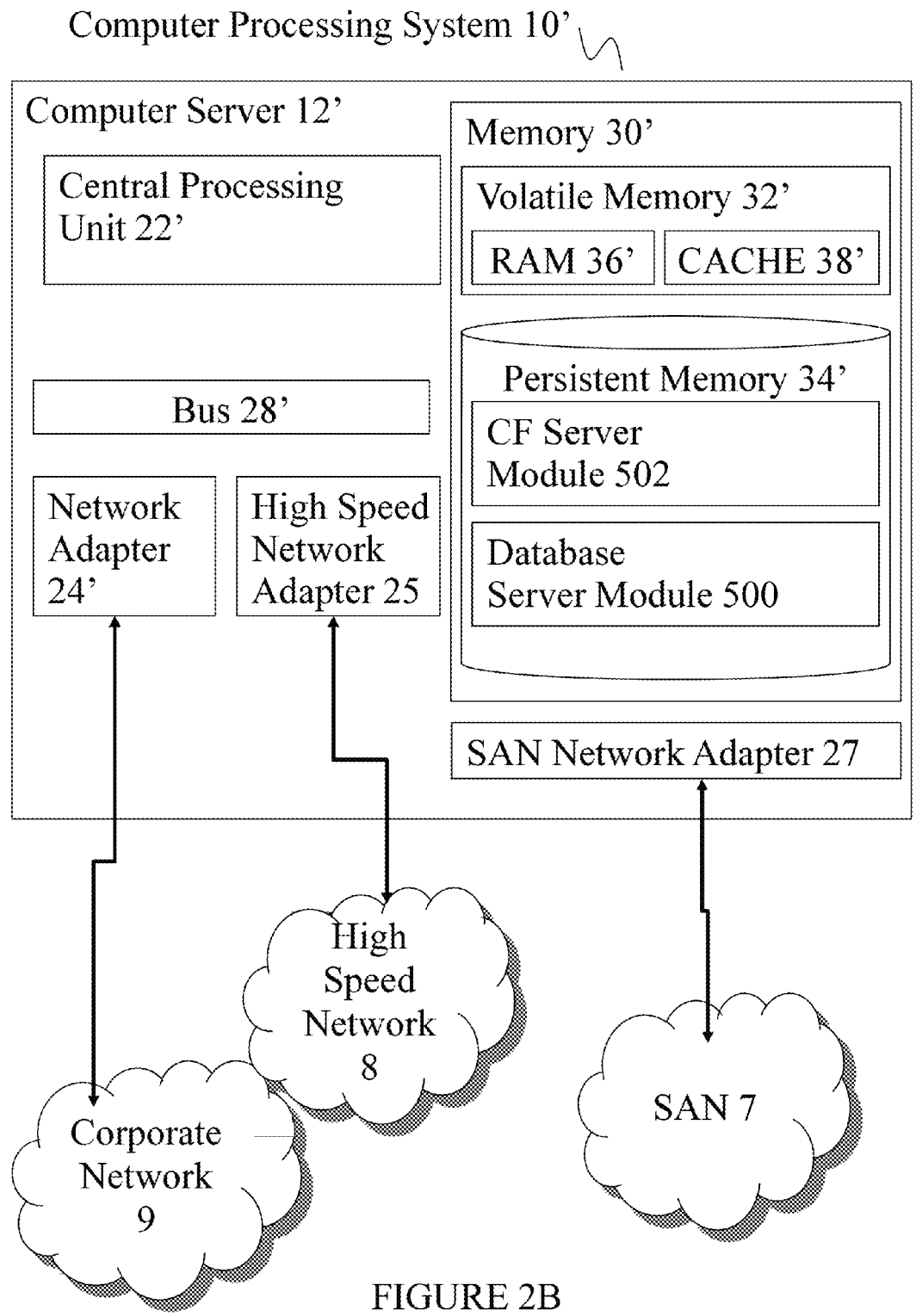
FIG. 2B is a component diagram of a computer server according to an embodiment of the invention.

Referring to FIG. 2B, the deployment of database server module 500 and database and CF server module 502 are described in computer processing system 10' for computer server 12' according to a particular embodiment. Common components of the computer client and computer server of FIGS. 2A and 2B are described in parallel below. Symbol' (the prime symbol) is used to label different instances of equivalent components in FIG. 2A and FIG. 2B.

Computer processing systems 10 and 10' are operational with numerous other general purpose or special purpose computing system environments or configurations. Examples of well-known computing processing systems, environments, and/or configurations that may be suitable for use with computer processing systems 10 and 10' include, but are not limited to, personal computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing systems 10 and 10' may be described in the general context of computer system-executable instructions, such as program modules, being executed by a computer processor. Generally, program modules may include routines, programs, objects, components, logic, and data structures that perform particular tasks or implement particular abstract data types. Computer processing systems 10 and 10' may be embodied in distributed cloud computing environments where tasks are performed by remote processing devices that are linked through a communications network. In a distributed cloud computing environment, program modules may be located in both local and remote computer system storage media including memory storage devices.

Computer processing system 10 may be a general-purpose computer client 12 and one or more input devices 14 and output devices 16 directly attached to the computer client 12. Computer processing system 10 is connected to corporate network 9. Similarly, the computer processing system 10' may also be a general-purpose computer server 12'. Computer processing system 10' is connected to corporate network 9; high speed network 8 and storage area network (SAN) 7. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 and 10' also communicate with network devices (not shown) over corporate network 9. Corporate network 9 can be a local area network (LAN), a wide area network (WAN), or the Internet.

Computer client 12 (computer server 12') typically includes a central processing unit (CPU) 22 (22'); network adapter 24 (24'); device adapter 26 (26'); bus 28 (28') and memory 30 (30'). CPU 22 (22') loads machine instructions from memory 30 (30') and performs machine operations in response to the instructions. Such machine operations include: increment or decrement a value in register (not shown); transfer a value from memory 30 (30') to a register or vice versa; take instructions from a different location in memory if a condition is true or false (also known as a conditional branch instruction); and add/subtract or perform logical operations such as AND, OR, XOR, NOT on the values in two different registers and put the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 (24') is connected to bus 28 (28') and corporate network 9 for enabling communication between the computer server 12 and network devices. Computer server 12' additionally includes high speed network adapter 25 and SAN network adapter 27. High speed network adapter 25 is connected to bus 28' and corporate network 9 for enabling high speed communication between the computer server 12' and other computer servers. Storage area network adapter 27 is connected to bus 28' and storage area network 7 for enabling high speed communication between the computer server 12' and storage systems including shared disk storage 5. Device adapter 26 is connected to bus 28 and input devices 14 and output devices 16 for enabling communication between computer server 12 and input devices 14 and output devices 16. Bus 28 (28') couples the main system components together including memory 30 (30') to CPU 22 (22'). Bus 28 (28') represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 (30') includes computer system readable media in the form of volatile memory 32 (32') and non-volatile or persistent memory 34 (34'). Examples of volatile memory 32 (32') are random access memory (RAM) 36 (36') and cache memory 38 (38'). Generally volatile memory is used because it is faster and generally non-volatile memory is used because it will hold the data for longer. Computer processing system 10 (10') may further include other removable and/or non-removable, volatile and/or non-volatile computer system storage media. By way of example only, persistent memory 34 (34') can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 (28') by one or more data media interfaces. As will be further depicted and described below, memory 30 (30') may include at least one program product having a set (for example, at least one) of program modules that are configured to carry out the functions of embodiments.

The set of program modules configured to carry out the functions of computer client 12 includes extended database client module 300 and application module 302. The set of program modules configured to carry out the functions of computer server 12' include CF server module 502 and database server module 500.

Further program modules that support the embodiment but are not shown typically include firmware, bootstrap program, operating system, and support applications. Each of the operating system, support applications, other program modules, and program data or some combination thereof, may include an implementation of a networking environment.

Network adapter 24 (24'), 25 and 27 communicate with the other components of computer client 12 or computer server 12' via bus 28 or 28'. It should be understood that although not shown, other hardware and/or software components could be used in conjunction with computer processing system 10 or 10'. Examples, include, but are not limited to: microcode, device drivers, redundant processing units, external disk drive arrays, redundant array of independent disks (RAID), tape drives, and data archival storage systems.

Referring to FIG. 2A, extended client module 300 and application module 302 operate in computer client 12 to provide an extended database client.

Referring to FIG. 2B, CF server module 502 and database server module 500 operate in separate computer servers 12' to provide a separate CF server (for example 4A or 4B) and a separate database server (for example member 1, 2, 3 or 4).

Referring to FIG. 3, extended database client 300 typically includes database client engine 302; transaction distribution analyzer 304; transaction type analyzer 306; query processor optimizer 308; query workload balancer 310; and extended database client method 400.

Database client engine 302 is for performing basic database client operations. Transaction distribution analyzer 304 is for identifying if a transaction is distributable. In a particular embodiment the specific transactions are tagged by an application as coded by the application developer but other embodiments are envisaged where transactions can be determined as distributable by a transaction distribution analyzer from principles. Transaction type analyzer 306 is for identifying further transaction types or properties such as long running transactions or short running transactions properties. In a particular embodiment such further types or properties are identifiable from additional tags. Query processor optimizer 308 is for locating the least busy query processor for processing a query as part of a distributable transaction. Other factors such as further transaction types and properties (for example long running transactions and short running transactions) are used to determine further levels of optimization. Query workload balancer 310 is for sending a query to the least busy query processor.

Extended database client method 400 is for controlling the extended database client 300 and comprises logical process block 402 to 418. Block 401 is performed by application module 302 wherein certain transactions are tagged as distributable (because they are defined by the application as distributable). Determining if a transaction is distributable from more general principles in extended database client module 300 would be processor intensive so it is more efficient to have specific transactions tagged by the application according to a particular embodiment. Block 401 is not part of extended database client method 400. Block 402 is for checking if the transaction is distributable by checking for a distributable tag in the transaction. The process continues to block 404 if the transaction is distributable else the process ends. Block 404 is for defining a loop for each query within the transaction. Block 406 is for selecting a database server for processing the query based on server weights.

Block 408 is for checking for open cursors, that if the present server is expecting more information (and has placed a cursor on the transaction) and proceeding to block 416 if open cursors exist. If no open cursors then block 410. Block 410 is for initiating transaction transfer for the selected new server and is described in more detail with reference to FIG. 4B if no open cursor exists. Block 412 is for sending the query to selected server. Block 414 is for updating and logging the server/application/transaction mapping. Block 416 is for looping back to block 404 to process the next query in transaction if there is a further query in the transaction. If no new transaction, then go to block 418. Block 418 is the end of method 400.

Figure 4A:
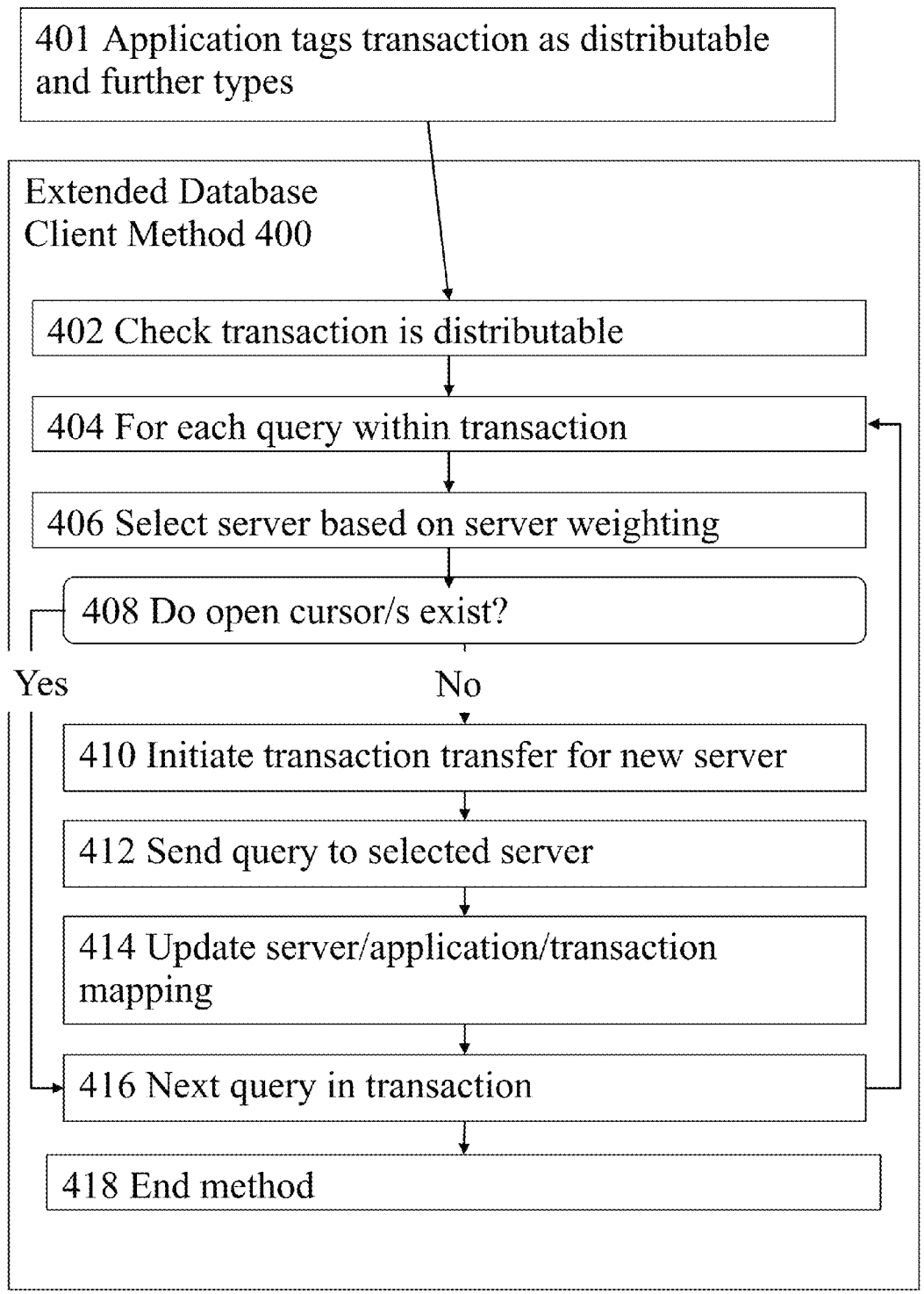
FIGS. 4A and 4B are flow diagrams of processes of the extended database client of a particular embodiment.
Figure 4B:
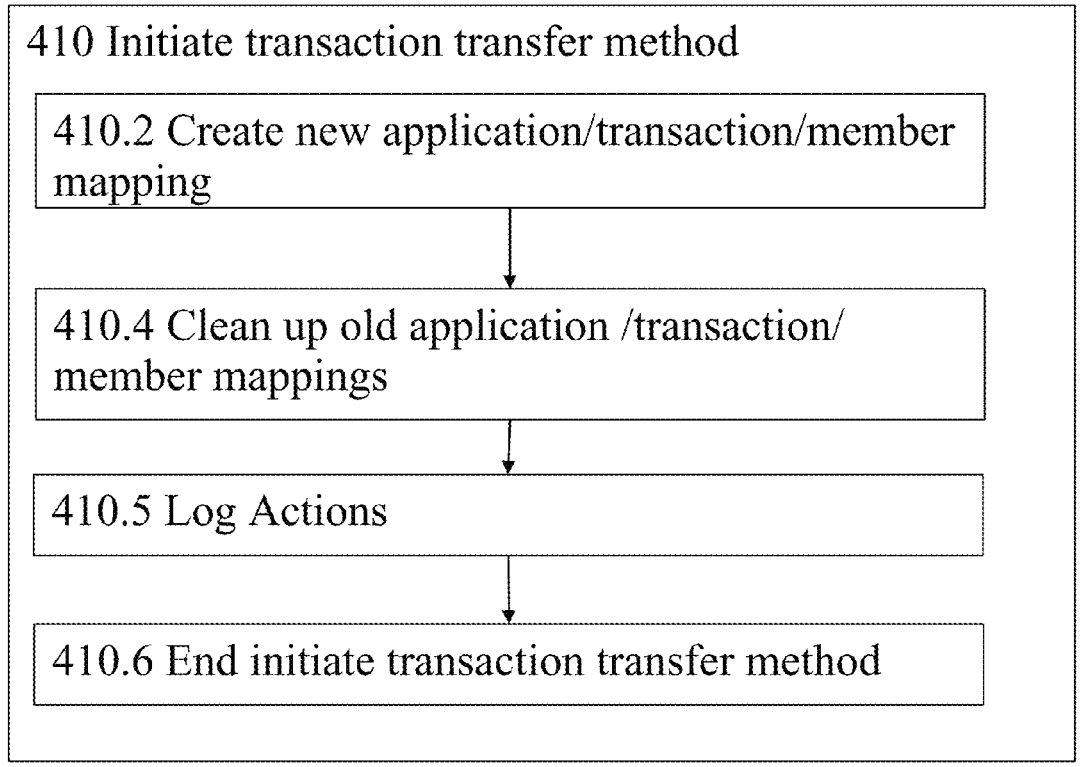

Referring to FIG. 4B, block 410 includes logical process blocks 410.2, 410.4 and 410.6. Block 410.2 is for creating a new application/transaction/member mapping. Block 410.4 is for cleaning up old application/transaction/member mappings. Block 410.5 is for logging actions. Write ahead logging is used in a particular embodiment to create a permanent record of what going to be created and cleaned up before these actions are complete. Therefore, in the event of a failure, the integrity of the database is not violated. Block 410.6 is the end of the initiate transaction transfer method whereby control is returned to the calling method.

Referring to FIG. 5A, database server module 500 includes: server engine 502; and a list of weights for each node member 504. Server engine 502 is for performing a query and returning a result to a client. The server engine records a workload capacity and communicates with other extended database servers to maintain a list of weights for relative workload capacity of all the extended database servers. List of weights for each node member 504 is maintained and stored on each database server.

Figure 5B:
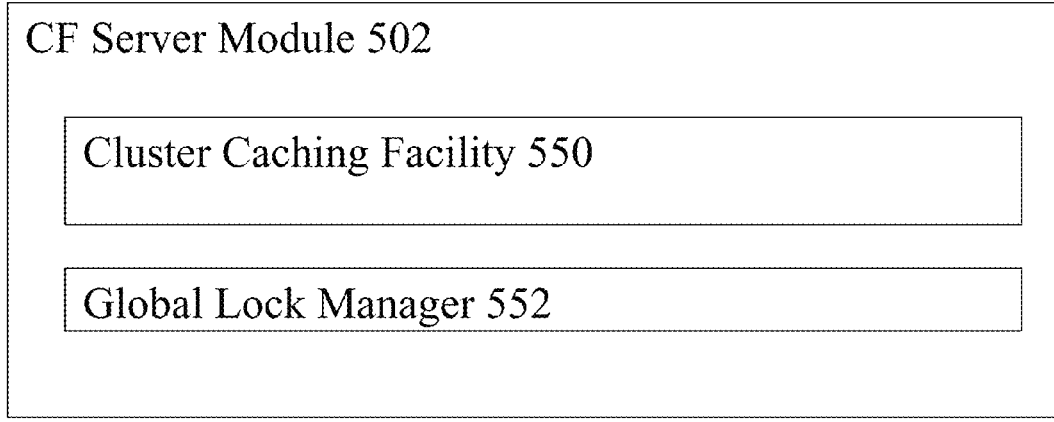

Referring to FIG. 5B, CF server module 502 typically includes cluster caching facility 550 and global lock manager 552. Cluster caching facility (CF) server module 550 is for providing faster data access as data fetched from the CF is fetched orders of magnitude faster than data fetched from the disk subsystems; and for providing serialization mechanism for data structures shared across members to ensure the consistency of the data. Global lock manager 552 is for managing locks on individual memory accesses to the common memory.

Figure 6A:
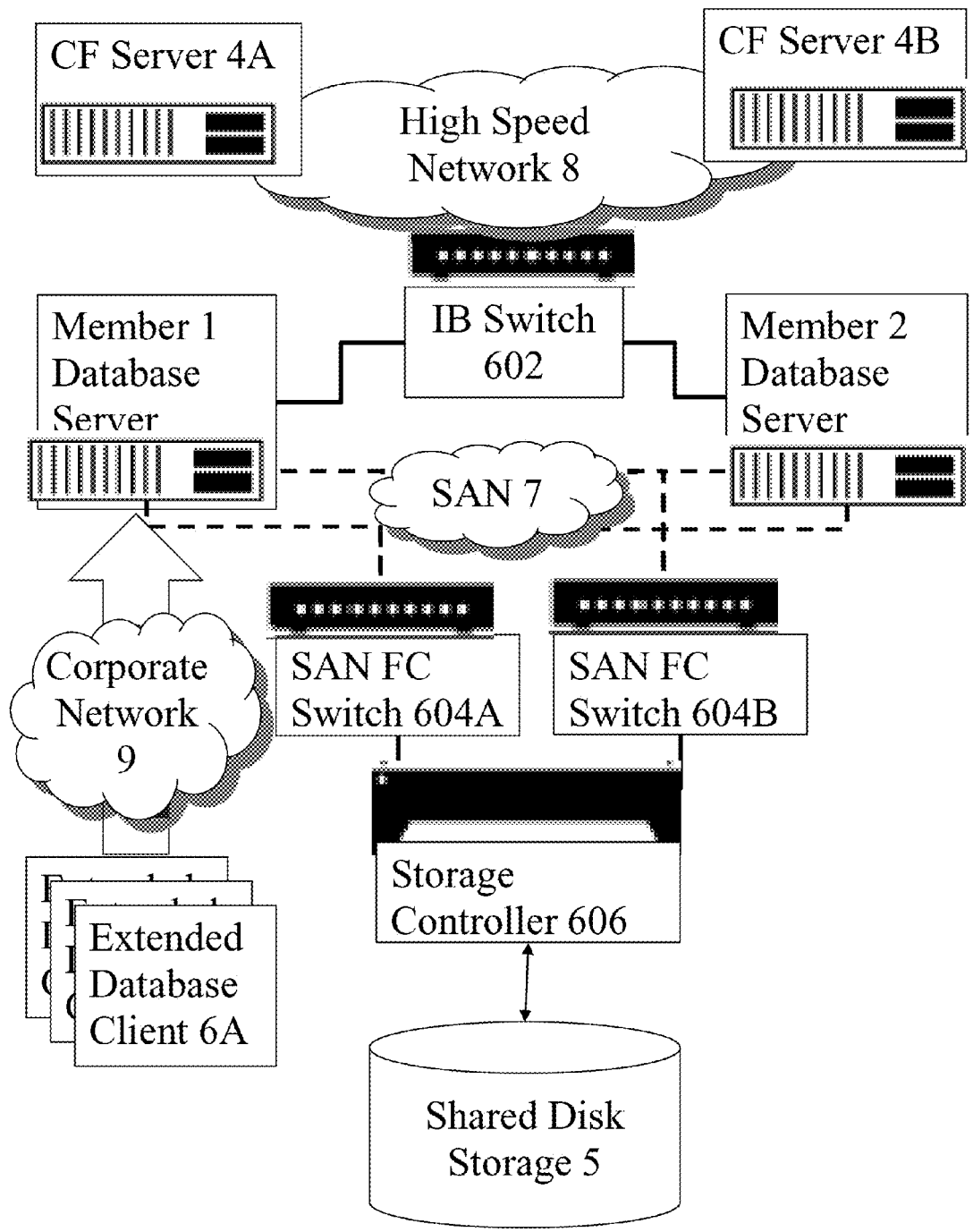
FIGS. 6A to 6C are example configuration diagrams showing two, three and four database servers respectively of certain embodiments.
Figure 6B:
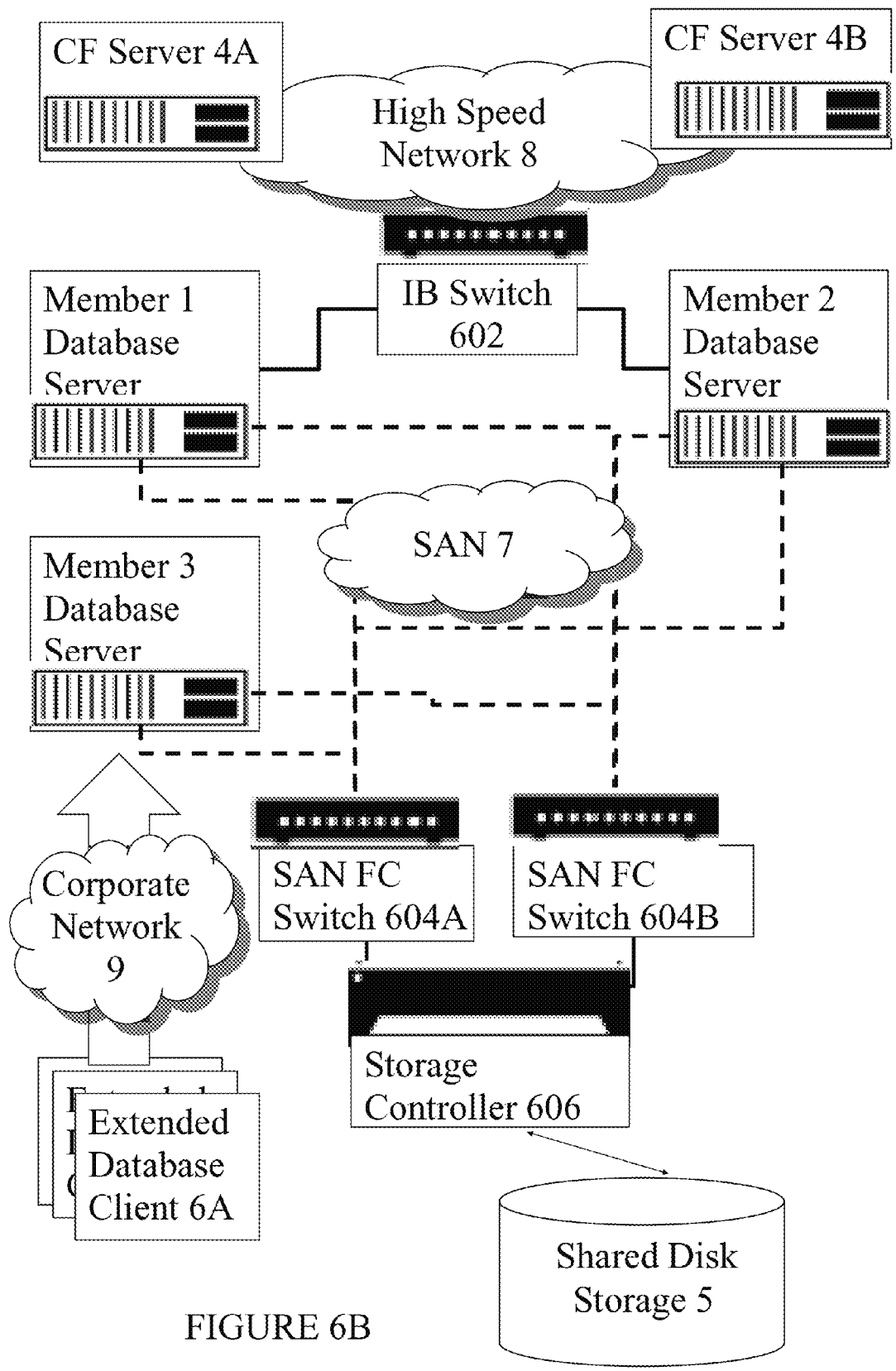
Figure 6C:
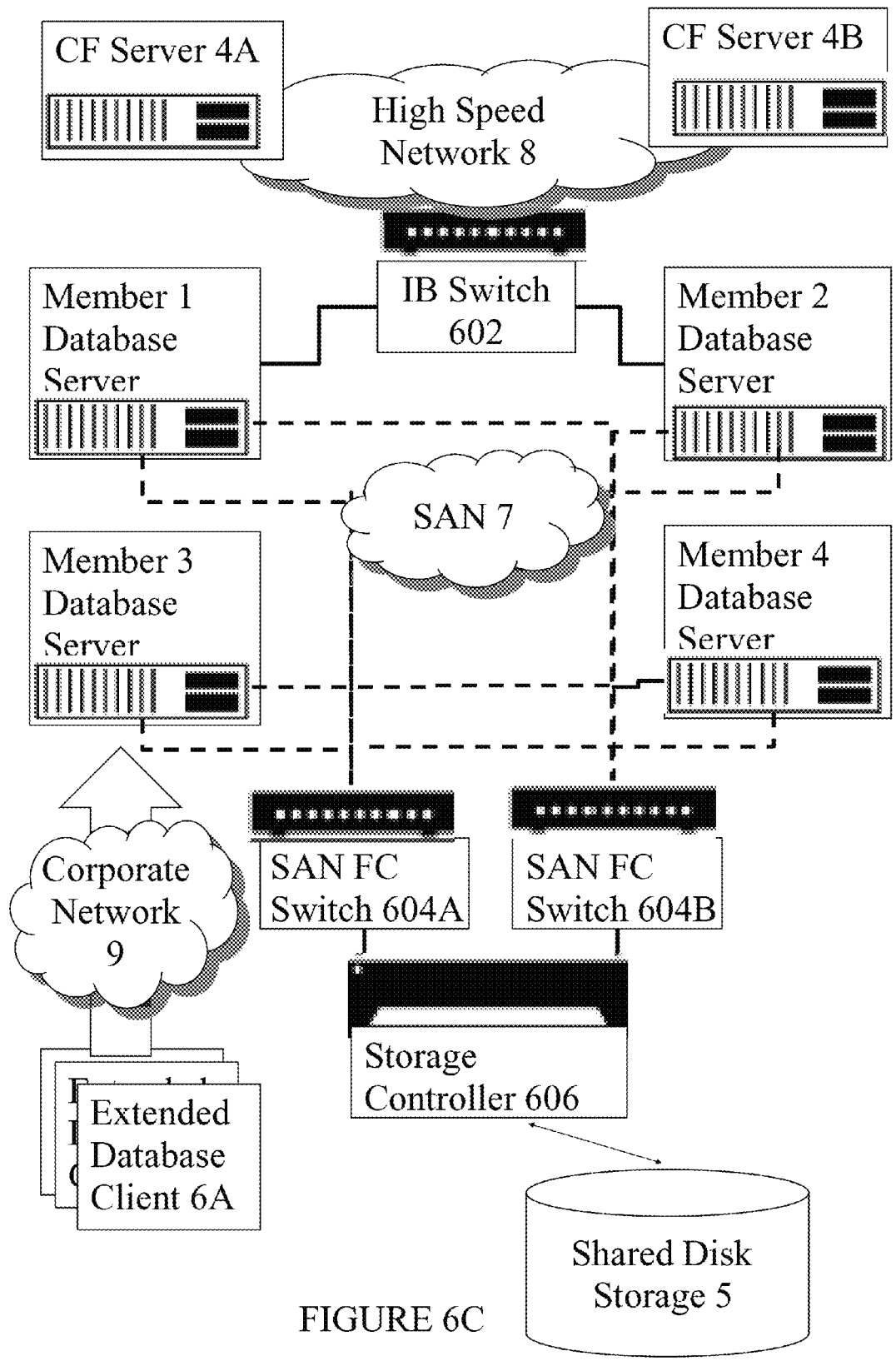

Referring to FIGS. 6A, 6B and 6C, three different configurations of database servers, CF servers and extended database clients demonstrate how scalable the solution is and how different configurations might operate (with increased detail compared to FIG. 1). Corporate network 9 is shown with a block arrow connecting to member 1, other members can connect to corporate network 9 by using member 1 as a gateway or by direct connection (not shown). High speed network 8 includes connections (shown by solid lines) to InfiniBand (IB) switch 602. Storage Area Network (SAN) 7 includes two SAN fibre channel (FC) switches 604A and 604B connected to each member (show by the dashed line); storage controller 606 and shared disk storage 5.

Referring to FIG. 6A, two CF servers (4A, 4B) and two database servers (member 1 and member 2) are configured as a system.

Referring to FIG. 6B, two CF servers and three database servers configured as a system (member 1, member 2 and member 3).

Referring to FIG. 6C, two CF server members and four database server members are configured as a system (member 1, member 2, member 3 and member 4). In FIGS. 6B and 6C, the data servers are connected to IB switch 602 although connection lines are not shown.

Referring to FIGS. 7A, 7B, 7C and 7D there are shown four states diagrams showing an example query from client 6A and three database servers (member 1, member 2 and member 3).

Figure 7A:
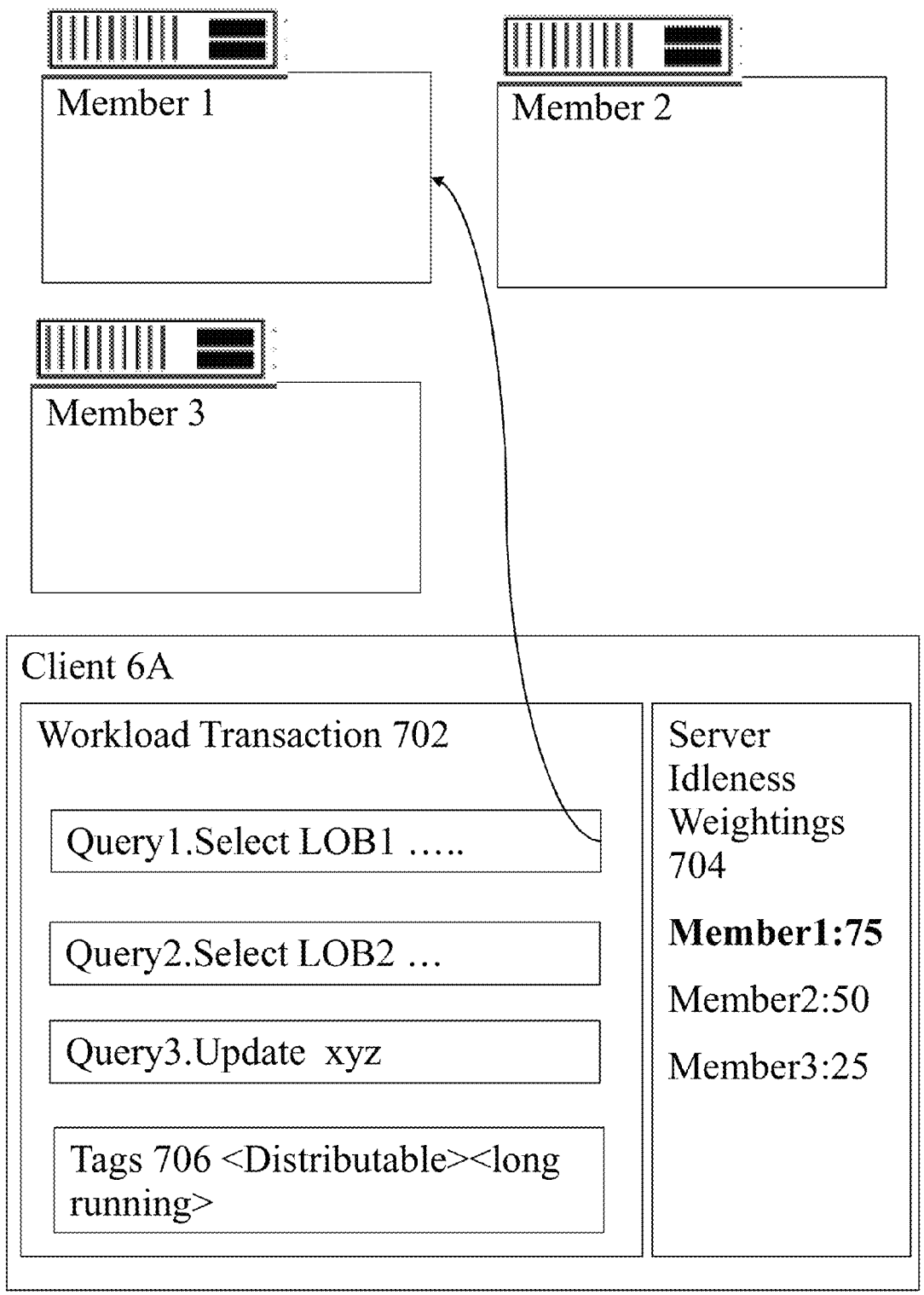
FIG. 7A to 7D is a series of state diagrams showing an example query and three database servers according to an embodiment of the invention.

Referring to FIG. 7A, the initial state of the system, client 6A has a work load transaction 702; server idleness weightings 704 and tags 706. Workload transaction 702 includes three queries: query1 for selecting large object 1 (LOB1) and performing some filtering to achieve a first result; query2 for selecting a second large object (LOB2) and performing some filtering and sorting to achieve a second result; and query3 for updating a part of the dataset. Sever idleness weightings 704 are received from the members. In this example the weights represent a magnitude of idleness of the servers but in other examples they might represent a magnitude of capacity. In the initial state, member 1 has the highest level of idleness at 75 with member 2 in the middle with 50 and member 3 being the least idle at 25. Tags 706 include a distributable tag and a long running tag. Distributable tag <distributable> indicates that the transaction is distributable. Long running tag <long running> indicates that the transaction is long running Extended database client makes a decision to distribute query1 to the member 1 since it is most idle at the initial state. This is represented by the arrow from query1 to member 1.

Figure 7B:
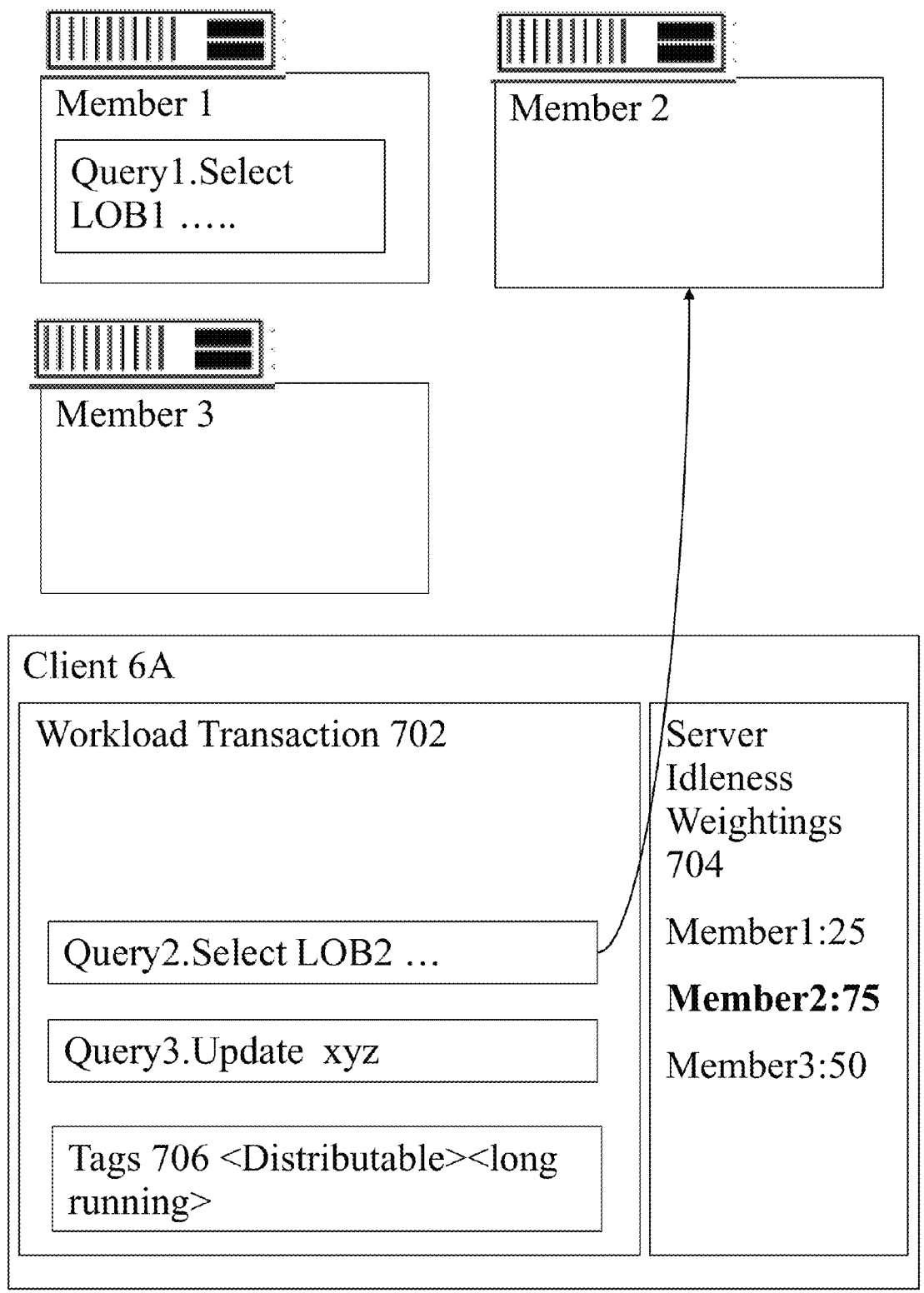

Referring to FIG. 7B, query1 has been sent to and is processed by member 1; server idleness weighting 704 have been updated. Now member 1 is busier and is the least idle with an idleness factor of 25 (previously 75). Member 2 is now the idlest with an idleness factor of 75 and member 3 is the second most idle with an idleness factor of 50. Client 6A makes a decision to distribute query2 to the member 2 since it is most idle at this stage. This is represented by the arrow from query2 to member 2.

Figure 7C:
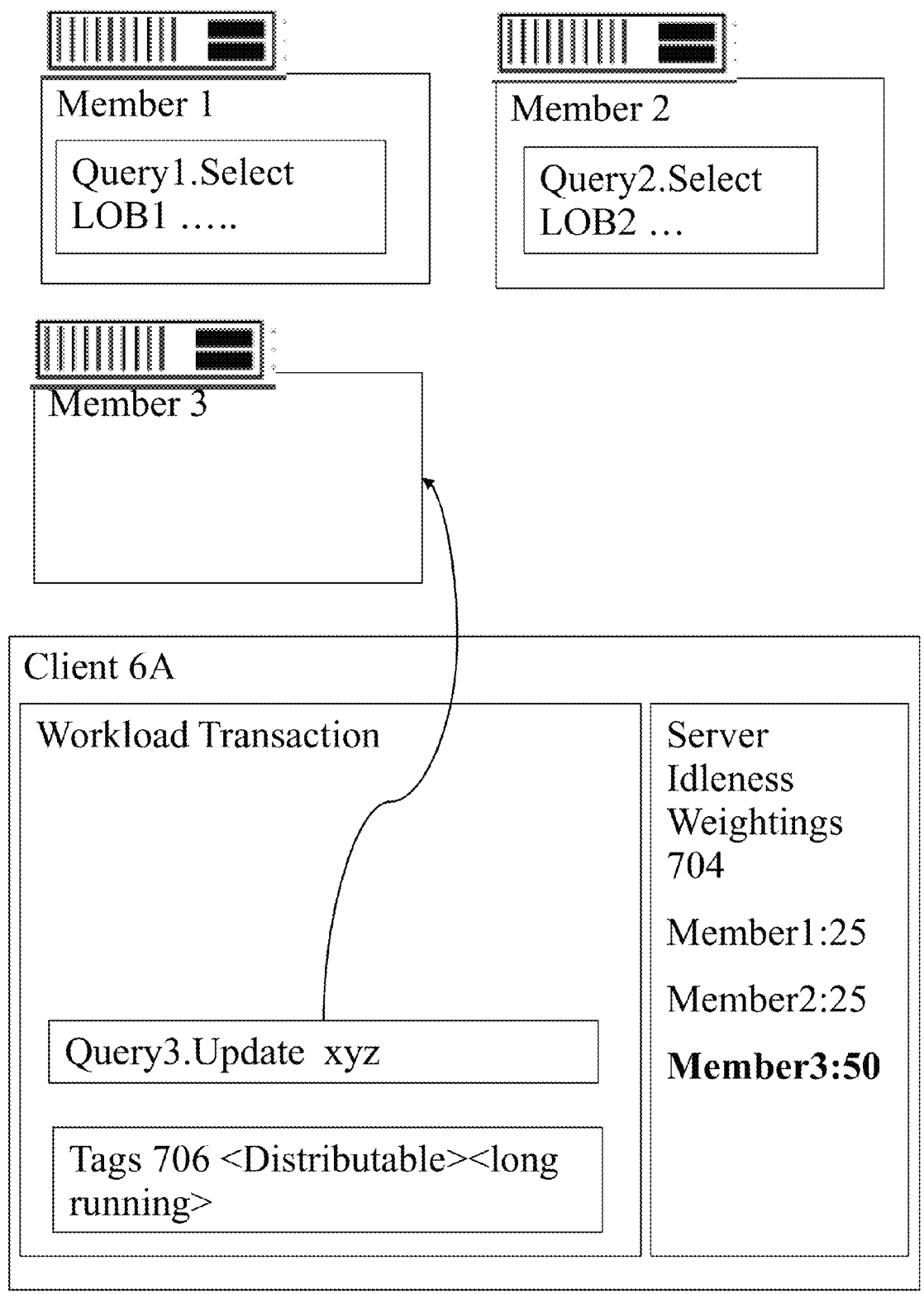

Referring to FIG. 7C, query2 has been sent to member 2 and is processed by member 2 and the server idleness weighting have been updated. Now member 2 is busy and is one of the least idle. Member 3 is now the idlest with an idleness factor of 50 with member1 and member 2 the least idle with an idleness factor of 25. Extended database client makes a decision to distribute query3 to the member 3 since it is most idle at this stage. This is represented by the arrow from query3 to member 3.

Figure 7D:
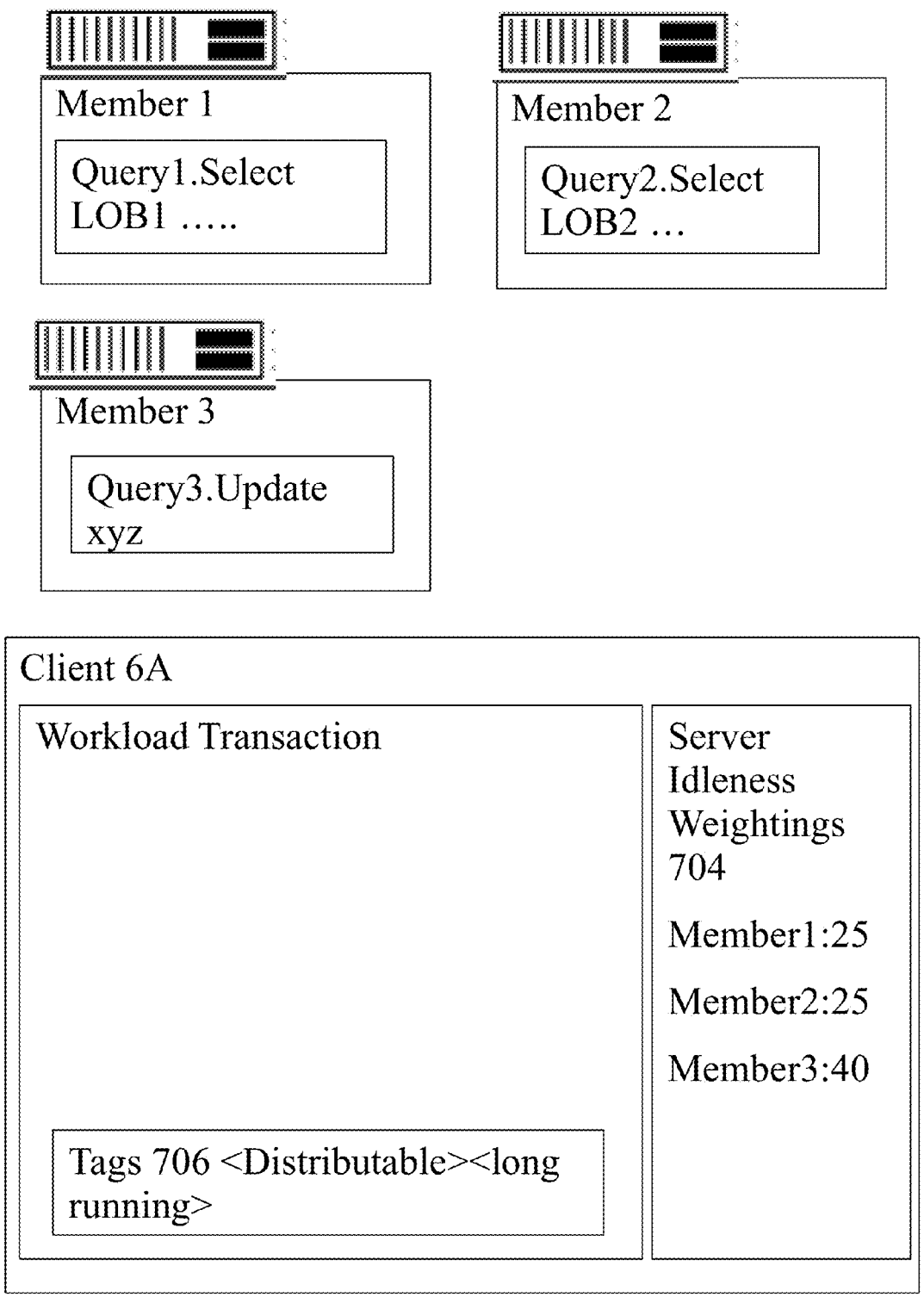

Referring to FIG. 7D, query3 has been sent to member 3 and is processed by member 3; server idleness weighting have been updated. Member 3 is still the idlest with an idleness factor of 40 with member 1 and member 2 the least idle with an idleness factor of 25. The transaction has no more queries and the transaction is complete after member 1, member 2 and member 3 have returned their respective results.

It will be clear to one of ordinary skill in the art that all or part of the logical processes of a particular embodiment may be alternatively embodied in a logic apparatus, or a plurality of logic apparatus, including logic elements arranged to perform the logical processes of the method and that such logic elements may include hardware components, firmware components or a combination thereof. Similarly, all or part of the logic components of a particular embodiment may be alternatively embodied in logic apparatus including logic elements to perform the methods described above, and that such logic elements may include components such as logic gates in, for example a programmable logic array or application-specific integrated circuit. This type of logic arrangement may further be embodied in enabling elements for temporarily or permanently establishing logic structures in such an array or circuit using, for example, a virtual hardware descriptor language, which may be stored and transmitted using fixed or transmittable carrier media.

A further alternative embodiment may be realized in the form of a computer implemented method of deploying a service that includes deploying computer program code operable to, when deployed into a computer infrastructure and executed thereon, cause the computer system to perform the method. The method and components of a particular embodiment may alternatively be fully or partially embodied in software stored on a computer program product or in a parallel computing system including two or more processors for executing parallel software.

It will be clear to one skilled in the art that many improvements and modifications can be made to the foregoing exemplary embodiment without departing from the scope of the present invention.

What is claimed is:

1. A distributed database management system for transaction processing comprising:
    two or more query processors with a common data source;
    at least one database client for managing a transaction including two or more queries;
    a transaction analyzer for checking if a transaction can be processed by more than one query processor, wherein the transaction analyzer is configured for determining that a tag indicating that the transaction is distributable is associated with the transaction, and for determining that a tag indicating that the transaction is a long running or a short running transaction;
    a query processor optimizer for locating the optimum query processor for each query in the transaction based on workload of each query processor;
    a workload balancer for directing each query to the new optimum query processor if the transaction can be processed by more than one query processor; and
    further comprising a lock mechanism for locking portions of the common data source at a query level to a new query processor, wherein the lock mechanism can be transferred to the new query processor when a transaction is transferred to a new query processor and using existing global lock and cache data, and the transaction is transferred as a whole.

2. A system according to claim 1, further comprising an application for interacting with the database client and for identifying a distributable transaction with the tag before it is sent to the database client.

3. A system according to claim 1, further comprising a cursor checker for identifying open cursors and aborting a transfer is an open cursor is identified.

4. A system according to claim 1, further comprising a logging engine for logging records of the mapping between the query processor, application and transaction.

5. A system according to claim 4, further comprising a roll back mechanism for rolling back a transaction using the log records.

6. A method for transaction processing in a distributed database management system comprising two or more query processors with a common data source and at least one database client for managing a transaction including two or more queries, said method comprising:
    checking if a transaction can be processed by more than one query processor, wherein a tag indicating that the transaction is distributable is associated with the transaction, and a tag indicating that the transaction is a long running or a short running transaction is associated with the transaction;
    locating the optimum query processor for each query in the transaction based on workload of each query processor;
    directing each query to the new optimum query processor if the transaction can be processed by more than one query processor; and
    locking portions of the common data source, via a locking mechanism, at a query level to a new query processor, wherein the lock mechanism can be transferred to the new query processor when a transaction is transferred to a new query processor and using existing global lock and cache data, and the transaction is transferred as a whole.

7. The method of claim 6, further comprising interacting with the database client and identifying a distributable transaction with the tag before it is sent to the database client.

8. The method of claim 6, further comprising updating a list of workload availability of each query processor and updating the query processor optimizer with the list of workload availability.

9. The method of claim 6, further comprising identifying and tagging a transaction with a transaction type.

10. The method of claim 6, further comprising identifying open cursors and aborting a transfer is an open cursor is identified.

11. The method of claim 6, further comprising logging records of the mapping between the query processor, application and transaction.

12. The method of claim 11 further comprising rolling back a transaction using the log records.

13. A computer program product for transaction processing in a distributed database management system, the computer program product comprising a computer-readable storage medium having computer-readable program code embodied therewith, the computer-readable program code configured to perform:

checking if a transaction can be processed by more than one query processor, wherein a tag indicating that the transaction is distributable is associated with the transaction, and a tag indicating that the transaction is a long running or a short running transaction is associated with the transaction;

locating the optimum query processor for each query in the transaction based on workload of each query processor;

directing each query to the new optimum query processor if the transaction can be processed by more than one query processor; and locking portions of the common data source, via a locking mechanism, at a query level to a new query processor, wherein the lock mechanism can be transferred to the new query processor when a transaction is transferred to a new query processor and using existing global lock and cache data, and the transaction is transferred as a whole.

14. The computer program product of claim 13, further comprising interacting with the database client and identifying the distributable transaction with a tag before it is sent to the database client.

15. The computer program product of claim 13, further comprising updating a list of workload availability of each query processor and updating the query processor optimizer with the list of workload availability.

16. The computer program product of claim 13, further comprising identifying and tagging a transaction with a transaction type.

\* \* \* \* \*